US012595738B2

(12) United States Patent
Paniagua-Perez et al.

(10) Patent No.: US 12,595,738 B2
(45) Date of Patent: Apr. 7, 2026

(54) TURBINE ROW WITH DIFFUSIVE GEOMETRY

(71) Applicant: Purdue Research Foundation, West Lafayette, IN (US)

(72) Inventors: Guillermo Paniagua-Perez, West Lafayette, IN (US); Sergio Grasa Martinez, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 81 days.

(21) Appl. No.: 18/215,016

(22) Filed: Jun. 27, 2023

(65) Prior Publication Data

US 2023/0417143 A1 Dec. 28, 2023

Related U.S. Application Data

(60) Provisional application No. 63/355,689, filed on Jun. 27, 2022.

(51) Int. Cl.
*F01D 5/14* (2006.01)

(52) U.S. Cl.
CPC ........ *F01D 5/141* (2013.01); *F05D 2240/302* (2013.01)

(58) Field of Classification Search
CPC ........................... F01D 5/141; F05D 2240/302
See application file for complete search history.

(56) References Cited

U.S. PATENT DOCUMENTS 9,051,839 B2 * 6/2015 Senoo ..................... F01D 5/141
9,879,539 B2 * 1/2018 Lentz ........................ F01D 5/16

OTHER PUBLICATIONS

Liu, Z. et al., Thermal Power Plant Upgrade via a Rotating Detonation Combustor and Retrofitted Turbine with Optimized Endwalls. International Journal of Mechanical Sciences, vol. 188, (2020); published online Jul. 15, 2020; Available online at https://doi.org/10.1016/j.ijmecsci.2020.105918.

* cited by examiner

*Primary Examiner* — Courtney D Heinle
*Assistant Examiner* — John S Hunter, Jr.
(74) *Attorney, Agent, or Firm* — Purdue Research Foundation

(57) ABSTRACT

A turbine row for an axial or mixed-flow fluid machine may include an airfoil, having a leading edge, a trailing edge, a pressure surface and a suction surface. The turbine row may further include two endwalls, extending from upstream of the airfoil leading edge to downstream of the airfoil trailing edge. The endwalls may define an inlet upstream of the leading edge of the airfoil and an outlet downstream of the airfoil. The endwalls have a contoured geometry which provides an increase in channel height from the inlet to the outlet and guarantees a throat area larger than the area of the inlet.

21 Claims, 13 Drawing Sheets

TURBINE ROW WITH DIFFUSIVE GEOMETRY

CROSS-REFERENCE TO RELATED APPLICATIONS

This application claims the benefit of U.S. Provisional Application No. 63/355,689 filed Jun. 27, 2022, the entirety of which is incorporated by reference herein.

GOVERNMENT RIGHTS

This invention was made with government support under DE-FE0032075 awarded by the U.S. Department of Energy. The government has certain rights in the invention.

TECHNICAL FIELD

This disclosure relates to turbines and, in particular, to rotors and stators.

BACKGROUND

Axial flow turbines are generally formed of a series of stationary and rotating rows, in that order. Both comprise several vanes or blades placed circumferentially. The pressure decreases through the turbine, extracting energy from the flow and producing power. In general, in any axial fluid machine, it is desirable to have a wide range of conditions in which it can operate. This way, the device will be able to tolerate any changes or fluctuations caused by any other components placed ahead. Furthermore, a large spectrum of operations is also beneficial during starting and stopping procedures. The component will be subject to transient conditions, potentially different from the on-design conditions. In addition, higher flexibility in terms of operation will also enhance the operability of a propulsive system.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
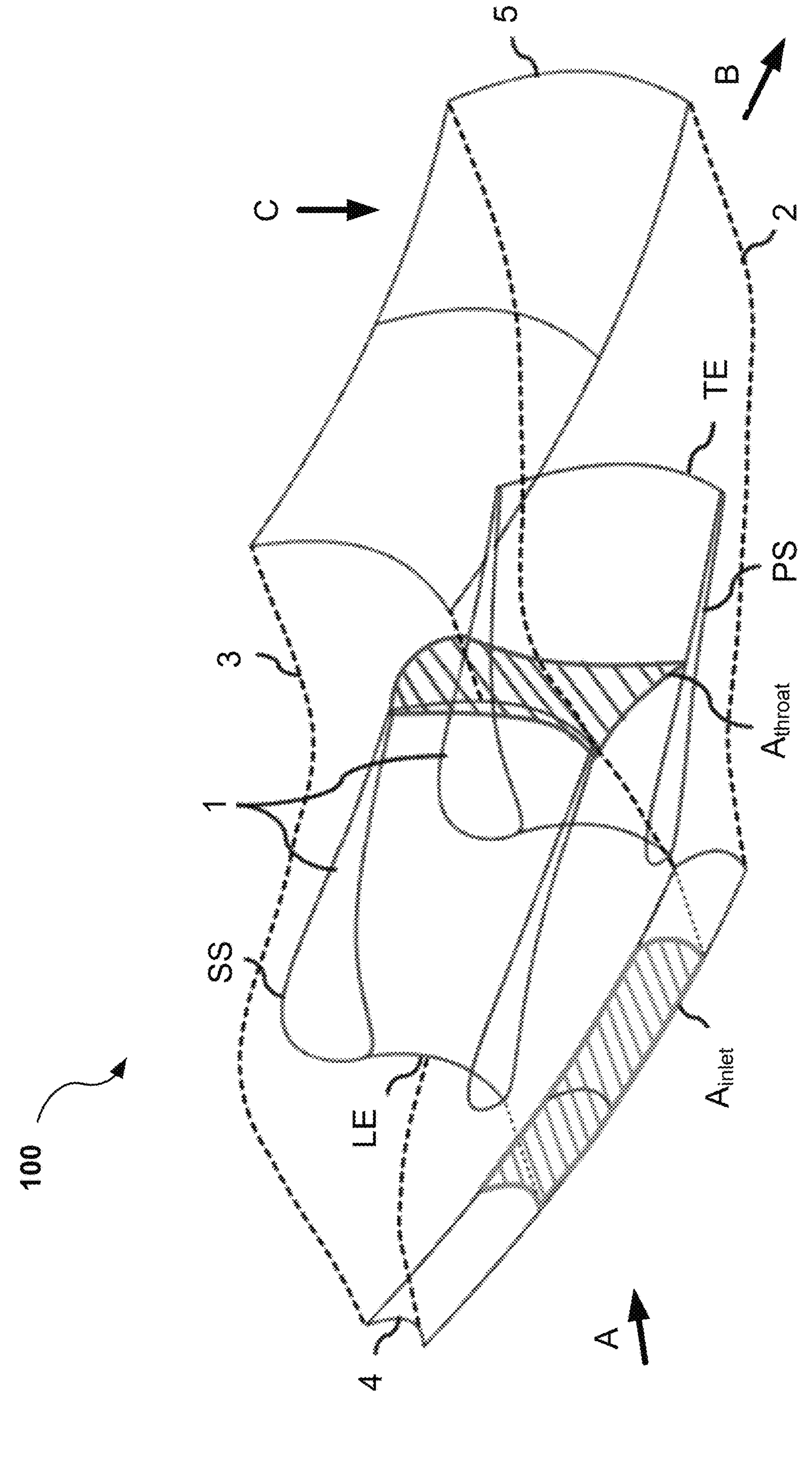
FIG. 1 illustrates an example of a turbine row, including endwall contouring and definition of the inlet and outlet planes

The present disclosure provides improvements to a stationary or rotating component in axial fluid machinery, especially in axial or mixed-flow turbines for gas turbine engines, power generation units, or other propulsive systems.

Axial flow turbines are generally formed of a series of stationary and rotating rows, in that order. Both comprise several vanes or blades placed circumferentially. The pressure decreases through the turbine, extracting energy from the flow and producing power.

In general, in any axial fluid machine, it is desirable to have a wide range of conditions in which it can operate. This way, the device will be able to tolerate any changes or fluctuations caused by any other components placed ahead. Furthermore, a large spectrum of operations is also beneficial during starting and stopping procedures. The component will be subject to transient conditions, potentially different from the on-design conditions. Finally, higher flexibility in terms of operation will also enhance the operability of the entire system, in this case, a gas turbine engine or any type of propulsive system.

In convergent ducts, there is an inherent limitation in the throat Mach number, where the throat, in such designs, refers to the position with the smallest area along the passage. For subsonic inlet conditions, the maximum throat Mach number is 1. On the contrary, for supersonic inlet conditions, the minimum throat Mach number is 1. This limitation can also be expressed in terms of the inlet Mach number. This implies an upper threshold for subsonic inlet Mach numbers and a lower threshold for supersonic inlet Mach numbers. If this limitation is not respected, the flow at the throat becomes unstable, creating a normal shock in front of the passage, which massively reduces the machine's performance.

These threshold values are a function of the geometry: the ratio of the throat to inlet areas and the pressure loss along the passage. Depending on its values, the operability of the component could be substantially limited, hampering the applicability and flexibility of the machine or even the entire system, for instance, a gas turbine engine.

Stationary vanes and rotating blades, called "stators" and "rotors", turn and increase the flow velocity, generally creating a convergent passage. Thus, both components are subject to the limitations in the inlet Mach numbers previously explained.

The flow conditions entering the turbine rows are generally stable in conventional gas turbine engines, with minor fluctuations and slight differences from on-design to off-design conditions. However, in other propulsive systems (for instance, Rotating Detonation Engines), the flow conditions are known to fluctuate substantially, even at the design point, having an unsteady behavior.

Consequently, the limitations in the inlet Mach number that conventional designs have, make this type of geometries unsuitable for these applications since they cannot operate under the entire range of fluctuating conditions.

The objective, therefore, is to design a stationary or rotating component that can provide turning to the flow for the entire range of inlet Mach numbers, covering both subsonic and supersonic regimes, without creating a normal shock in front of the passage.

The passage throat area must be larger than the inlet area to achieve full operability. The exact ratio of the throat-to-inlet area will depend on the inlet Mach number and the pressure loss.

The endwall geometry needs to be adapted so that the required throat area is achieved, which also depends on the turning provided by the airfoil.

Accordingly, a turbine row for an axial or mixed-flow fluid machine is provided. The turbine row comprises an airfoil and two endwalls, extending from upstream of the airfoil leading edge (LE) until downstream of the airfoil trailing edge (TE), characterized in that both endwalls have a contoured geometry that guarantees a throat area higher than the inlet area.

In some examples, the endwalls are smooth contours with variable angles along the intended flow direction, which may provide a more efficient diffusion with the same length compared to other types of diffusers.

In some examples, the endwalls are designed to provide a controlled diffusion with the smallest length possible, making a unit suitable for compact fluid machinery.

In other applications, in which a higher throat-to-inlet area ratio is necessary, longer endwalls may be beneficial to minimize flow detachment and increase the device's performance, at the expense of a less compact unit.

The channel height increase may be differently distributed along the axial direction, having most of the diffusion either upstream of the airfoil leading edge (LE) or along the airfoil itself. Preferably the distribution should be selected depending on the inlet conditions, the airfoil geometry, and the passage height ratio.

The vane or blade may have extensions upstream of the airfoil leading edge (LE) and downstream of the airfoil trailing edge (TE). These components may be used close to the endwalls, where the flow is prone to separation while preserving the original airfoil geometry in the rest of the channel.

The endwall geometry may have a different curvature at the hub than at the casing. Preferably, each endwall should be adapted depending on the profile of the inlet conditions and the geometrical constraints.

The endwalls may or may not be axisymmetric. In an axisymmetric configuration the endwall geometry remains unaltered along the circumferential coordinate (B) for a given axial location. However, in a non-axisymmetric configuration the endwall geometry varies along the circumferential coordinate (B) for a given axial location.

Preferably the endwall design should consider non-axisymmetry, to account for the impact of the airfoil on the diffusion along the passage. Non-axisymmetric endwalls with a larger diffusion in front of the airfoil and a smaller diffusion in-between blades may provide a performance benefit compared to other symmetric and non-axisymmetric endwall configurations.

Additional and alternative embodiments and technical advancements are made evident in the detailed description included herein.

FIG. 1 illustrates an example of a turbine row, including endwall contouring and the definition of the inlet and outlet planes (100). Only a portion of the turbine row (100) is shown in FIG. 1, and one of ordinary skill would appreciate the turbine row (100) would follow a generally has an annular shape around the centerline of a turbine. The turbine row (100) may be a stationary or rotating row in a turbine. The turbine row (100) may include a hub endwall (2), a shroud endwall (3) and a circumferential (B) array of airfoils (1). For stationary vanes, the airfoils (1) are rigidly attached to both the hub endwall (2) and shroud endwall (3), as shown in FIG. 1. For rotating blades, the airfoils (1) are attached to the hub but have some clearance from the shroud.

The endwalls and the suction and pressure sides of the airfoils define a flow passage. The flow passage is a channel that grows radially (R) in the flow direction (A). The hub endwall radius is reduced, and the shroud endwall radius increases from the inlet (4) to the outlet (5). The hub endwall radius and shroud endwall radius are defined with respect to a centerline of rotation for a turbine where the turbine row is placed.

As described herein, the word channel refers to the space in-between airfoils and between the shroud endwall (3) and hub endwall (2). In other words, a turbine row has multiple channels defined between each of the airfoils.

The inlet (4) may have an inlet area ($A_{inlet}$). The portion of the inlet area ($A_{inlet}$) highlighted in FIG. 1 corresponds to the inlet area for a channel between two adjacent airfoils, which is herein a channel inlet area. Only a portion of the inlet area is shown in highlighted in FIG. 1 Alternatively or in addition, the channel inlet area may be bounded by the endwalls (3,4) and the intersection of planes axially extending from the leading edges (LE) of the airfoils to the inlet (4). However, with respect to the entire row (as the sum of all the individual channels together), then the inlet area is the entire annular area around the row. Since a row is a repetition of the same airfoil all around, one may generally refer to the inlet area of just one channel and not the entire annulus. One of ordinary skill in the art would make the distinction between inlet area of an entire row or inlet area of a channel, depending on the context of whether a single channel or entire row was being discussed.

As described herein, a throat refers to a portion of the channel defined between the pressure side of a first airfoil and a suction side of a second airfoil and bounded by the shroud endwall 2 and hub endwall 3. Depending on the design, the location where the throat intersects the pressure side of the first airfoil and the suction side of the second airfoil may vary. The throat may have an area ($A_{throat}$), which is a cross section of the throat. The height of the throat is referred to as the distance between the shroud endwall (3) and hub endwall (2).

Figure 2:
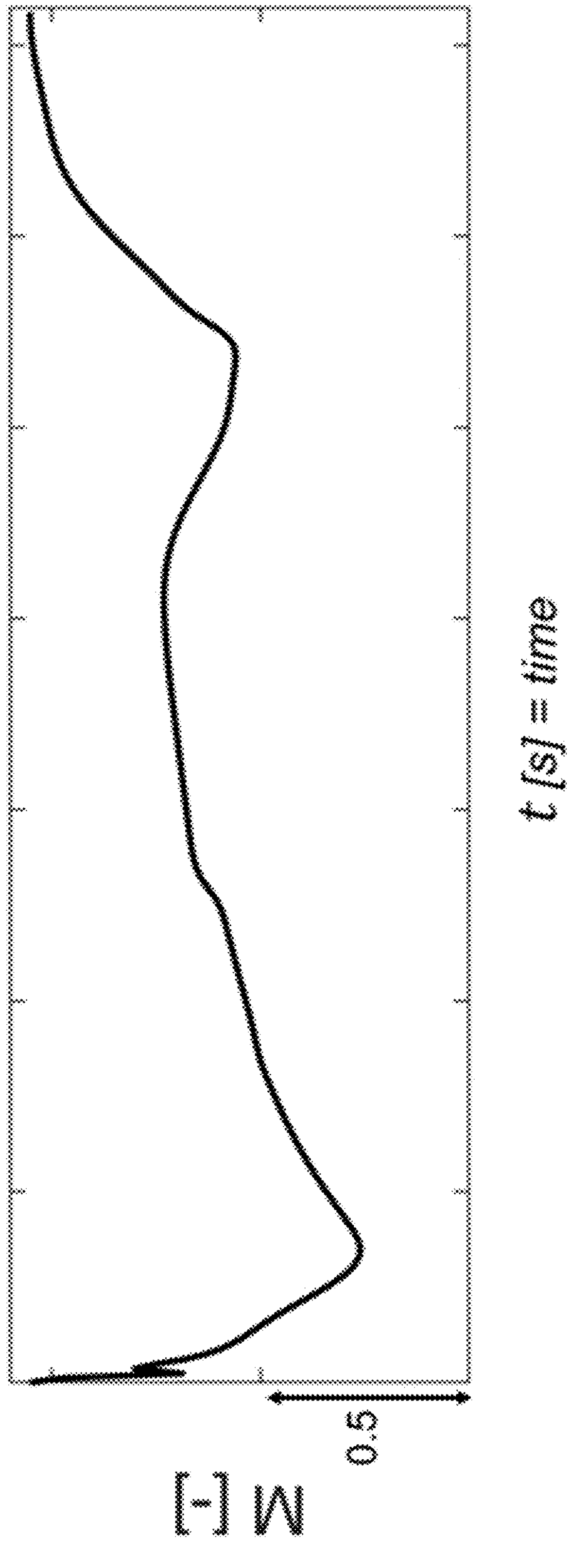
FIG. 2 is an example of a fluctuating inlet Mach number profile under which the turbine row could operate.
Figure 3:
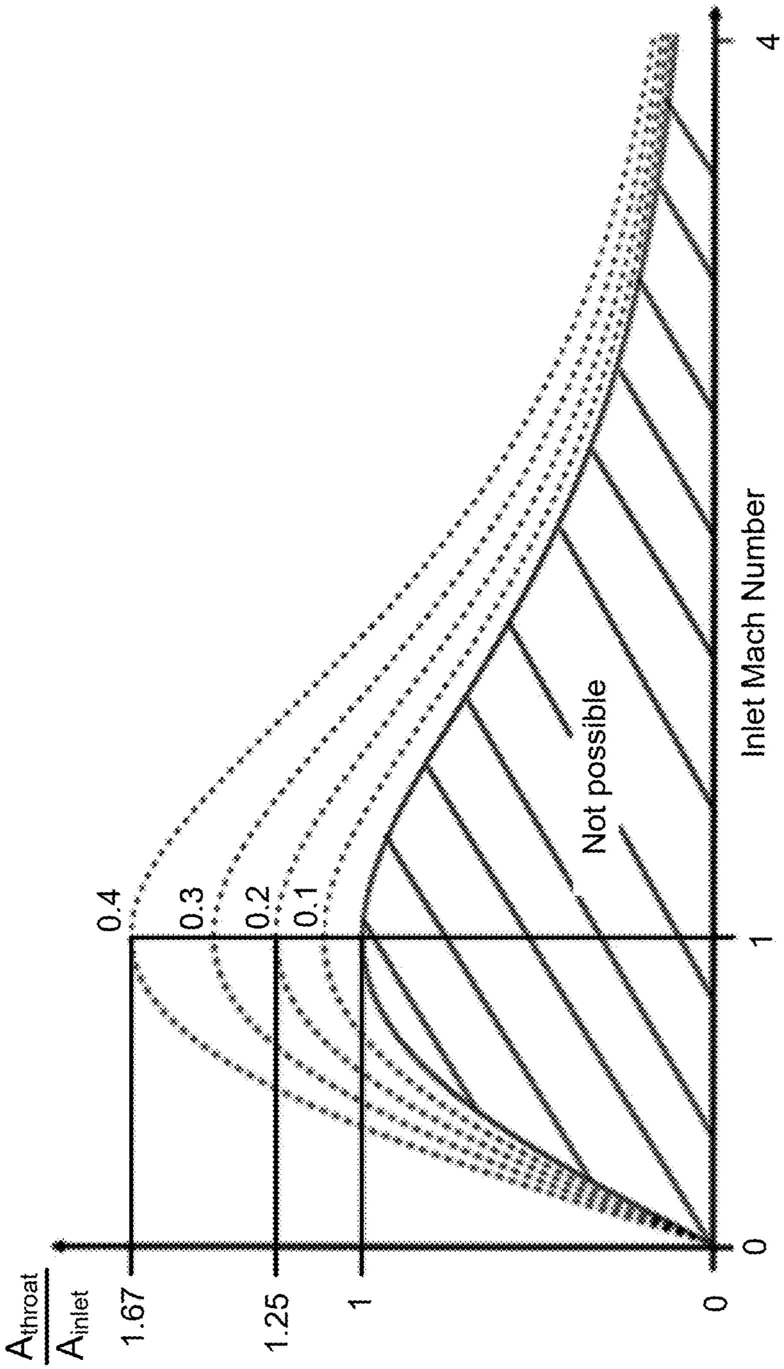
FIG. 3 illustrates the required throat-to-inlet area ratio as a function of the inlet Mach number and the pressure loss.

FIG. 2 is an example of a fluctuating inlet Mach number profile under which the turbine row could operate. As previously mentioned, the turbine row described herein is able to turn the flow for any inlet Mach number, both subsonic and supersonic values. This implies it can operate under fluctuating, unsteady Mach number inlet conditions, similar to the profile shown in FIG. 2. FIG. 3 illustrates a desired throat-to-inlet area ratio as a function of the inlet Mach number and the pressure loss. For the ideal case with no pressure loss (solid black line), the area ratio to cover the entire Mach number range is 1. As the losses increase (dashed lines), the required ratio grows above 1. The pressure loss is non-dimensionalized dividing by the total pressure at the inlet (e.g., 0.1 represents a pressure loss equal to 10% of the inlet total pressure)

Figure 4:
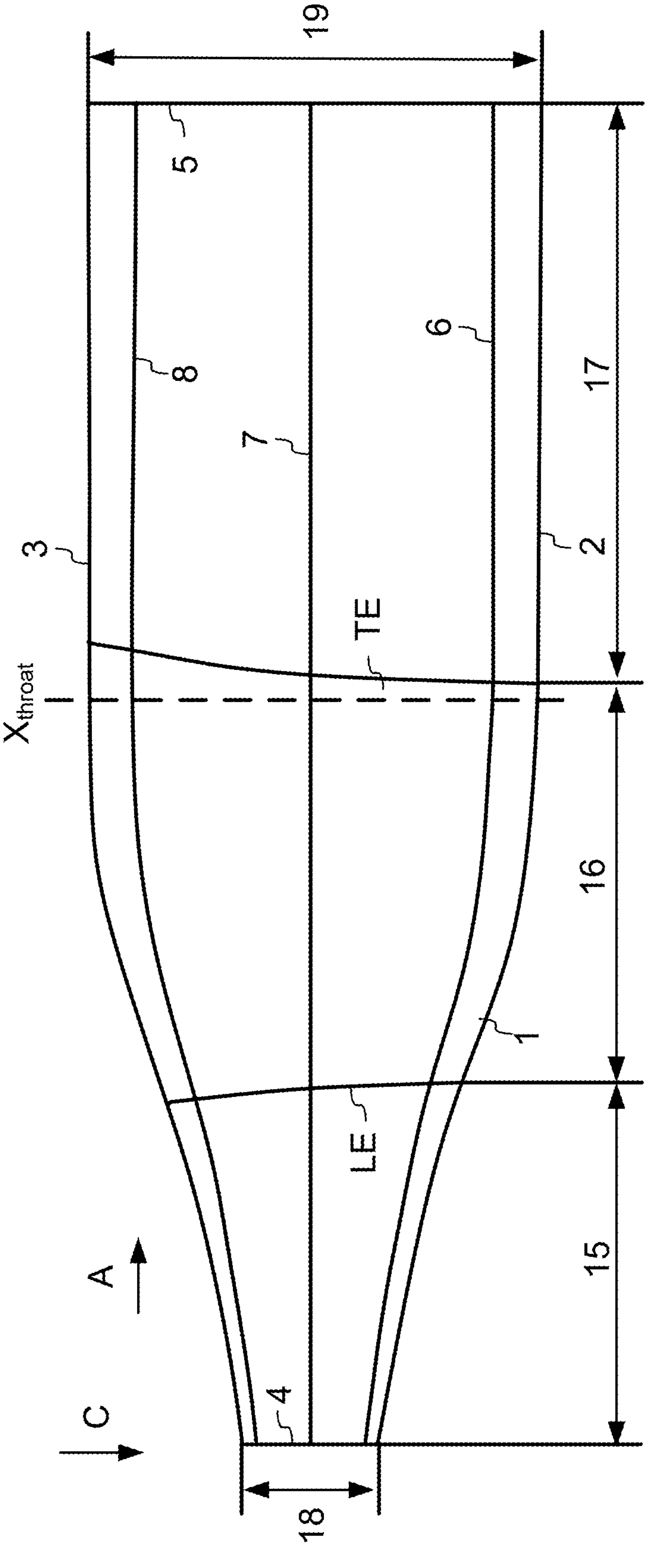
FIG. 4 illustrates an example of a meridional view of a turbine row

FIG. 4 illustrates an example of a meridional (radial (C) versus axial (A)) view of the turbine row. Arrow A indicates the direction of the flow axially going in. In this case, the endwalls (2,3) are symmetric with respect to the mean passage radius (7), which defines the midline of the endwalls and the airfoil. It is observed how the contouring begins ahead of the airfoil leading edge (LE) and continues along the airfoil itself until the trailing edge (TE). Nevertheless, the endwall contouring may be extended further downstream of the trailing edge (TE). The outlet plane (5) has been placed long enough from the airfoil for illustrative purposes. In a real turbine arrangement for any gas turbine engine or propulsive system, the rotor row would be placed right after the outlet plane (5), as it will be appreciated by those skilled in the art.

The endwall geometry (2,3) is built with polynomial curves with control points, like spline curves, which provide flexibility in the design while guaranteeing the continuity of the curvature. As opposed to other types of diffusing passages, this type of curves allows for a variable angle and curvature. This offers substantial improvements to control diffusion efficiently while minimizing its length, adapting the geometry to the different regions upstream (15), along (16), and downstream (17) of the airfoil. The ability to provide the desired conditions while minimizing flow separation is enhanced with this type of contoured geometries, as it will be appreciated by those skilled in the art.

Figure 5:
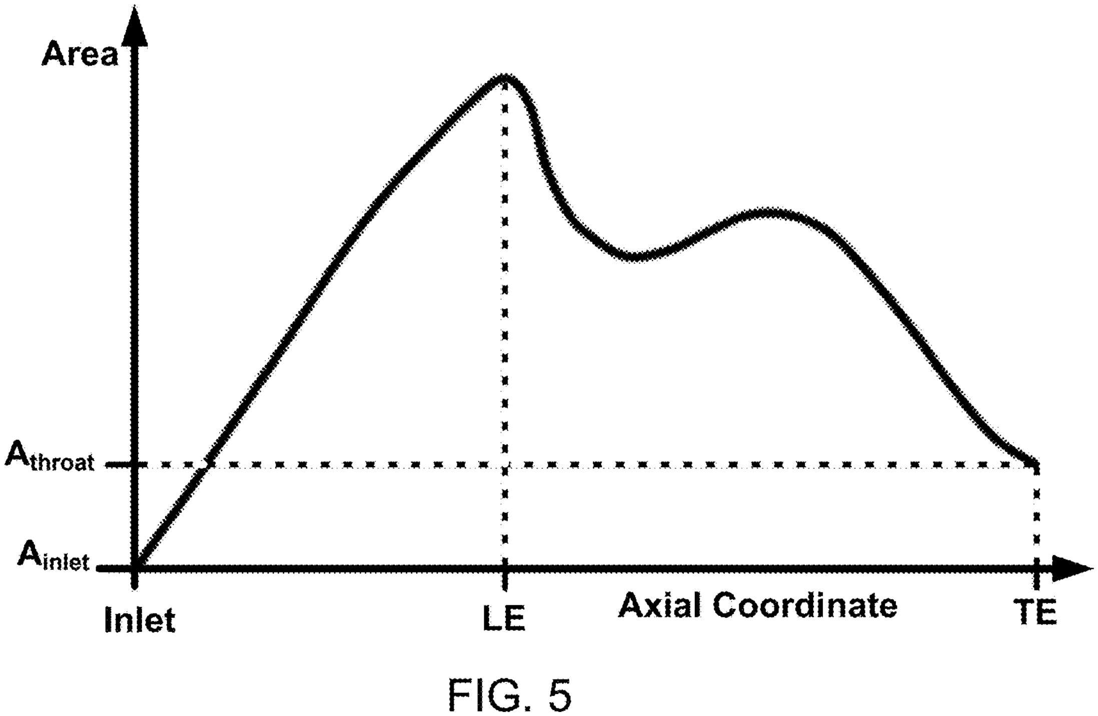
FIG. 5 illustrates a chart of the passage area of a turbine row plotted as a function of the axial coordinate.

FIG. 5 illustrates a chart of the passage area of the turbine row in FIG. 1 plotted as a function of the axial coordinate. There is a progressive increase in area from the inlet (4) until the airfoil leading edge (LE), thanks to the endwall contouring previously mentioned. At the airfoil, the area begins to smoothly decrease due to the flow turning between adjacent airfoils. Despite the increase in channel height from the airfoil leading edge (LE) to trailing edge (TE), the contraction generated by the turning in-between airfoils is high enough to reduce the flow area towards the trailing edge (TE). However, as illustrated in FIG. 5, the throat area (in this case, the outlet area) is higher than the inlet area.

Thanks to the vast level of endwall contouring shown in FIG. 1, the vane turning reaches 70-75 degrees, which is a state-of-the-art value for a high-pressure turbine vane, and still, as demonstrated in FIG. 5, the throat area (in this case, the outlet area) is higher than the inlet area.

Previous concepts attempted to achieve large outlet areas (although lower than the inlet area) with channel height increases of 10-20% of the channel inlet height. Nonetheless, the vane turning was limited to 20-30 degrees, considerably minimizing the power extraction. With this technology, channel height increases of 230% are attained, providing a vane turning as high as 70-75 degrees.

Due to the vast difference in the channel height increase compared to previous work, a completely different approach in terms of geometry, curvature and overall shape must be used, which will be appreciated by those skilled in the art.

Figure 6:
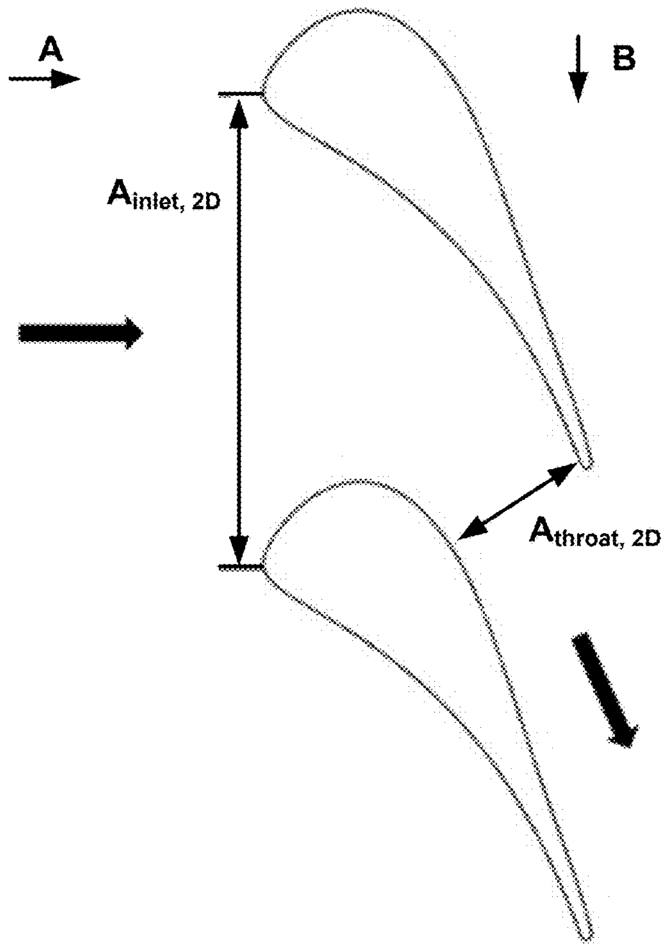
FIG. 6 is a schematic of the passage between two adjacent airfoils, seen in two dimensions, axial and circumferential.

FIG. 6 is a schematic of the passage between two adjacent airfoils, seen in two dimensions, axial (A) and circumferential (B). It shows the inherent reduction in the area by turning in-between airfoils.

Referring back to FIG. 4, a consequence of the channel height variation (18,19) is that the radius of constant span surfaces (6,8) also changes along the direction of the intended flow (A), with span being a common turbomachinery term defined as the percentual radial position (0% hub, 100% shroud). Thus, three different constant span surfaces are included in FIG. 4, 10% span (6), 50% span (7), and 90% span (8).

Figure 7:
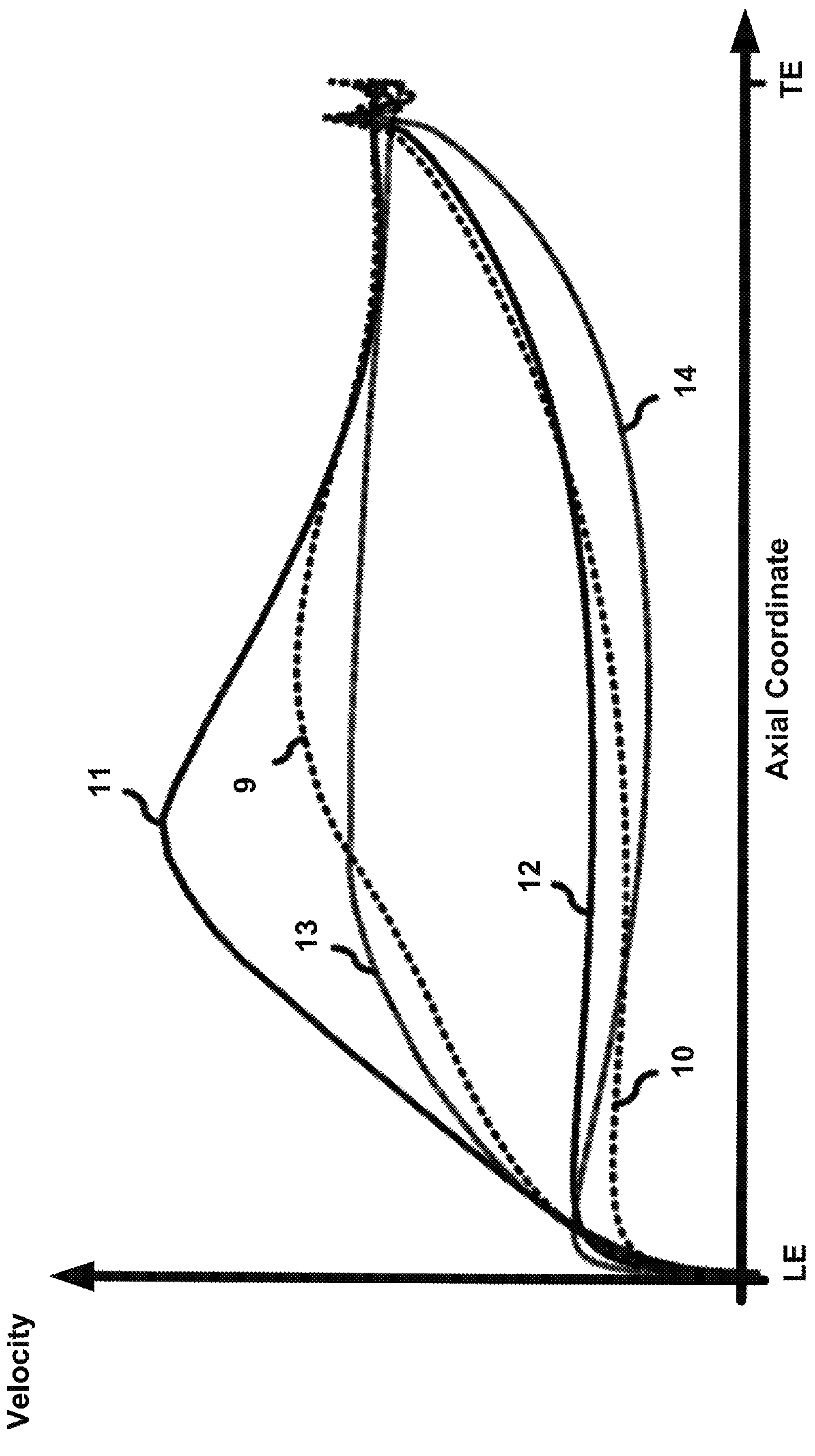
FIG. 7 is a graphical illustration of the change of velocity around the airfoil at different radial positions.

FIG. 7 is a graphical illustration of the change of velocity around the airfoil at different radial positions. The flow velocity around the airfoil surface is plotted versus the axial coordinate from the airfoil leading edge (LE) to trailing edge (TE) for the three different spans shown in FIG. 4 (6,7,8). Due to the increase in the channel height along the airfoil, there is a combination of opposed effects. Reducing the hub endwall radius (2) and the growth of the shroud endwall radius (3) increases the flow area. As a consequence, the pressure rises, and the velocity is lowered. On the other hand, the airfoil turns the flow and reduces its area as it goes through, decreasing the pressure and increasing the velocity.

It can be appreciated that the balance of these two effects varies with the span. The suction (9) and pressure (10) surface velocity profiles at 10% span (6) are similar to the corresponding suction (13) and pressure (14) surface velocity profiles at 90% span (8). Slight differences are expected due to the airfoil geometry not being the same at both spans. However, there is a substantial difference in the suction (11) and pressure (12) velocity profiles at 50% span (7), since this one has a higher velocity level both in the suction and pressure surfaces. The acceleration created in the first half of the axial chord is lower at 10% (6) and 90% (8) span compared with 50% (7), where the flow does not experience the effect of the passage height variation.

Further configurations of the turbine row are shown in FIGS. 8 to 13. The arrangements are similar to that shown in FIG. 4, but each one includes one or several modifications that could be useful or necessary depending on the specific design case, which will be appreciated by those skilled in the art.

Figure 8:
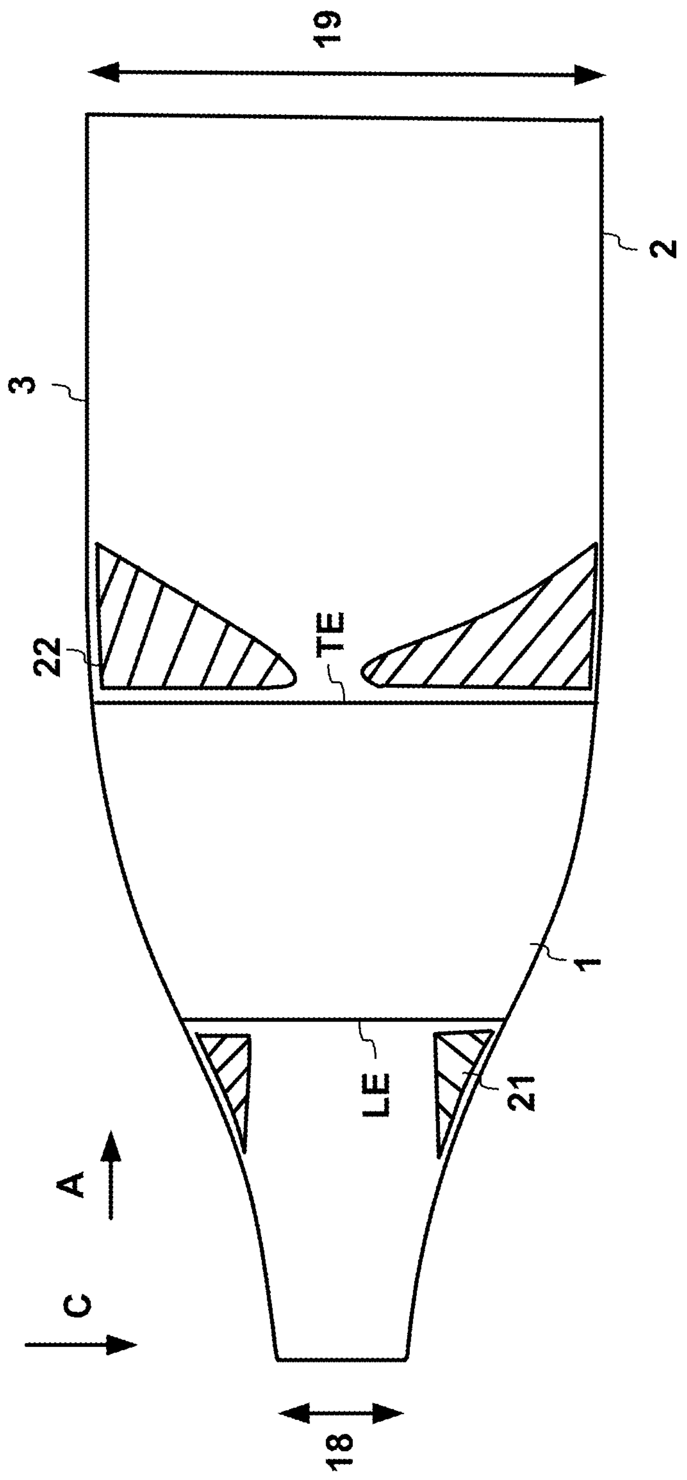
FIG. 8 illustrates an example of a turbine row having extensions of the airfoil both upstream of the leading edge and downstream of the trailing edge.

FIG. 8 illustrates an example of a turbine row having extensions (21,22) of the airfoil both upstream of the leading edge (LE) and downstream of the trailing edge (TE), located close to the hub and casing endwalls. This configuration will provide more momentum to the boundary layer close to the endwalls, thus minimizing flow separation. Furthermore, the original airfoil (1) geometry can remain unaltered at midspan, where the flow does not generally detach. The length and height of the extensions may vary for each specific design case and may not be symmetric to the mean radius, as it will be appreciated by those skilled in the art.

Figure 9:
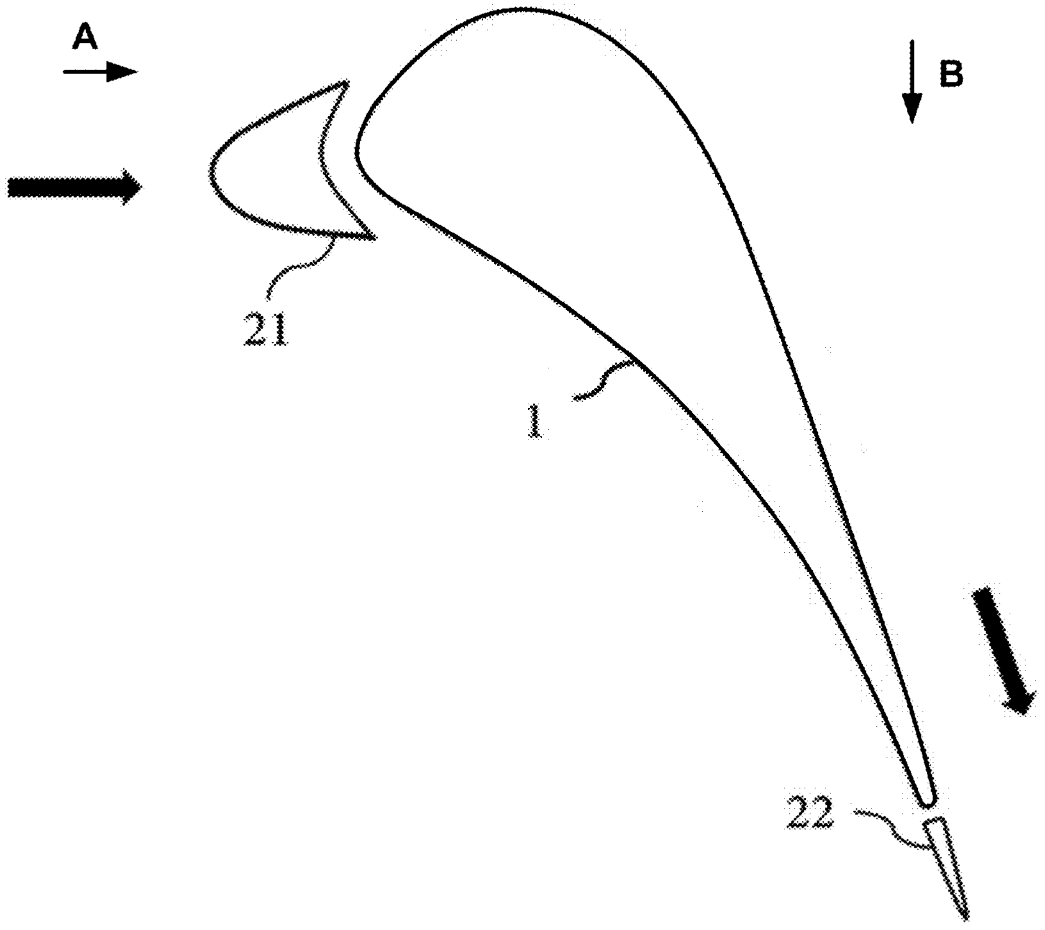
FIG. 9 illustrates a blade-to-blade view of the configuration described in FIG. 8, close to the endwalls.

FIG. 9 illustrates a blade-to-blade view of the configuration described in FIG. 8, close to the endwalls. The extensions (21,22) provide additional guidance to the flow. Moreover, the slots between the extensions (21,22) and the airfoil (1) allow boundary layer re-energization, with flow moving from the pressure side (PS) to the suction side (SS). These features help to minimize flow separation, as it will be appreciated by those skilled in the art.

Figure 10:
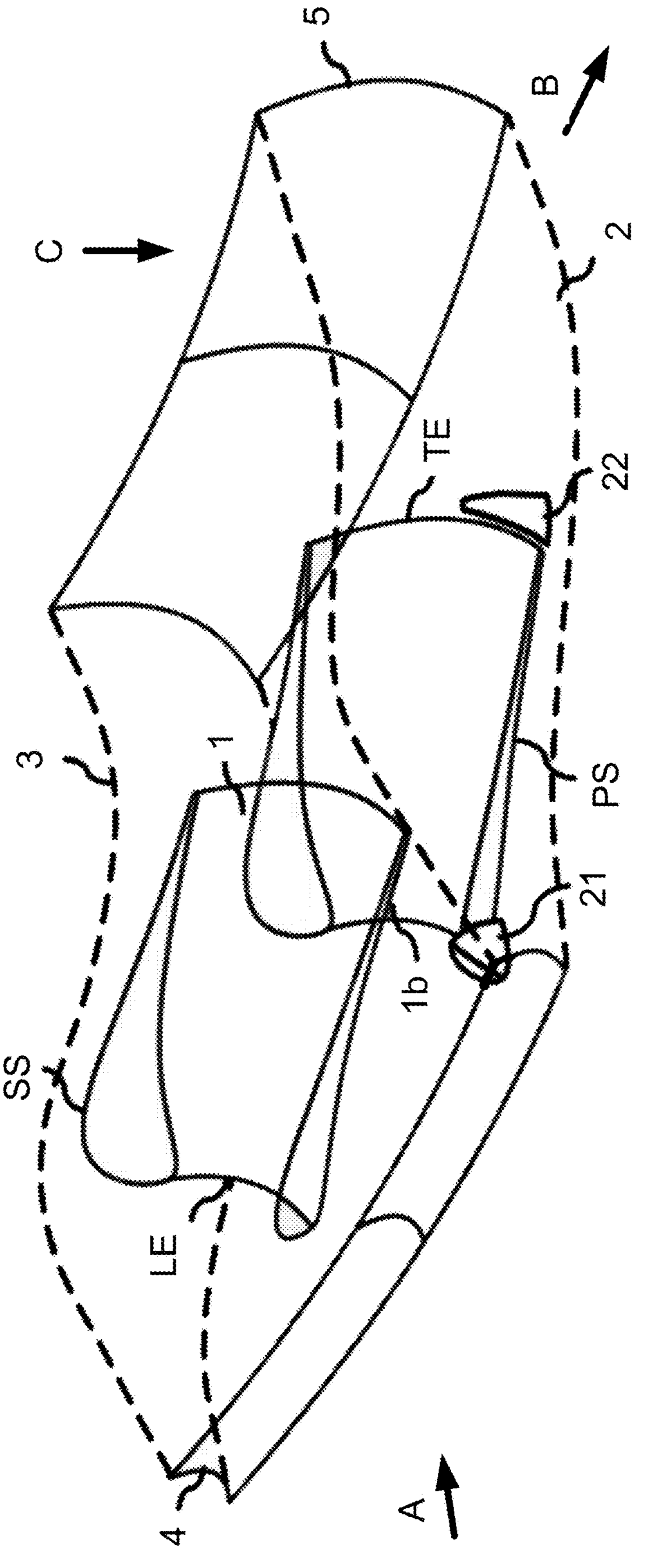
FIG. 10 illustrates a 3D view of the configuration described in FIGS. 8-9.

FIG. 10 illustrates a 3D view of the configuration described in FIGS. 8-9, showing the radial and circumferential dimensions of the extensions (21,22) described before. The extensions are attached to the endwalls, in a similar manner as the airfoils are attached to the endwalls. Nonetheless, the concept and procedure used to mount the extensions may also differ from the procedure used to mount the airfoils.

The extensions (21,22) are attached to the endwalls both in stationary and rotary turbine rows. In stationary configurations, the extensions may be mounted on any of the endwalls. In a rotary configuration however, the extensions may only be mounted on the hub endwall, to which the rotary airfoil is also attached.

Figure 11:
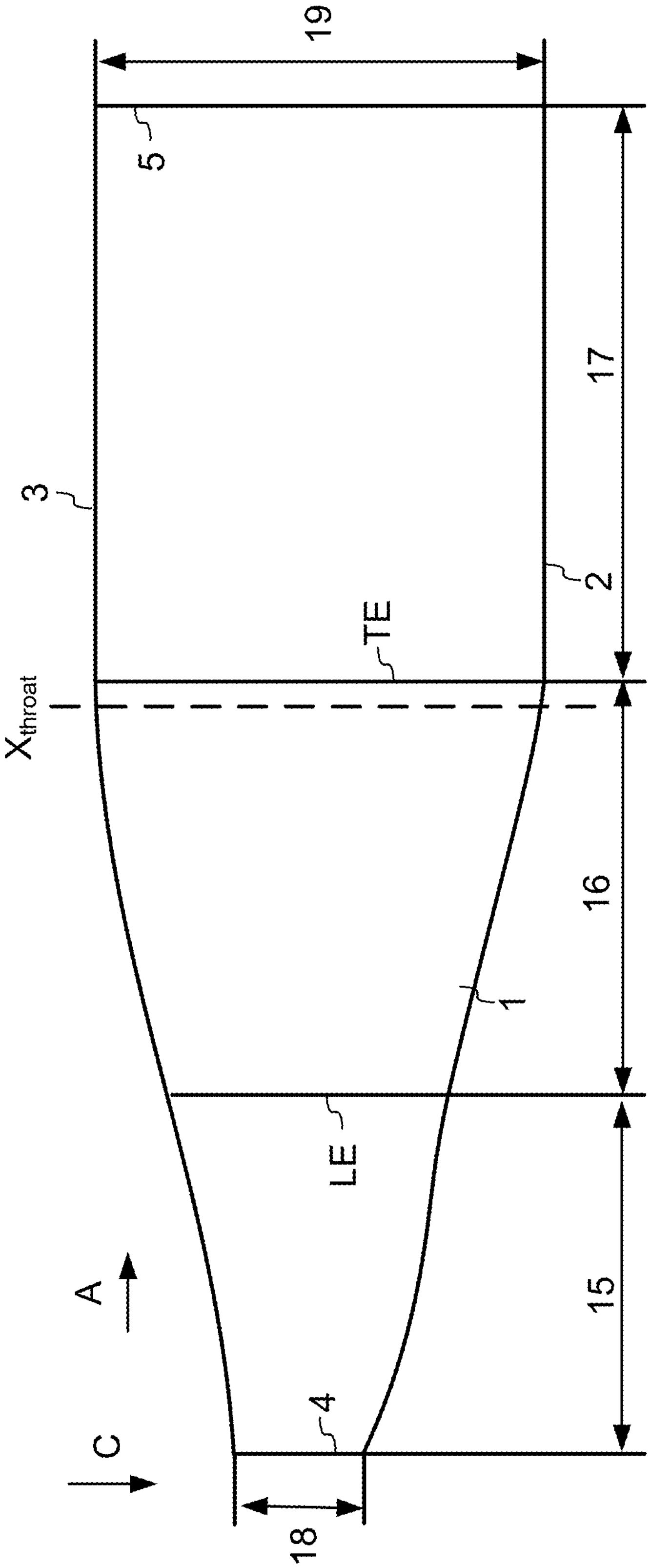
FIG. 11 illustrates an example of a turbine row where the hub endwall is not symmetric to the shroud endwall regarding the passage mean radius.

FIG. 11 illustrates an example of a turbine row where the hub endwall (2) is not symmetric to the shroud endwall (3) regarding the passage mean radius. This type of configuration may be selected to improve the fluid-dynamic performance of the complete vane unit, accounting for 3-dimensional area effects, and adapt the design to inlet conditions that may vary along the radial direction.

In other cases, the arrangement shown in FIG. 11 may be chosen due to geometrical constraints. In gas turbine engines or other propulsive systems, the space available is generally not the same, moving inwards (towards the engine shaft) than moving outwards. Thus, in these cases, the amount of endwall radius variation could be very different between hub endwall (2) and shroud endwall (3).

Figure 12:
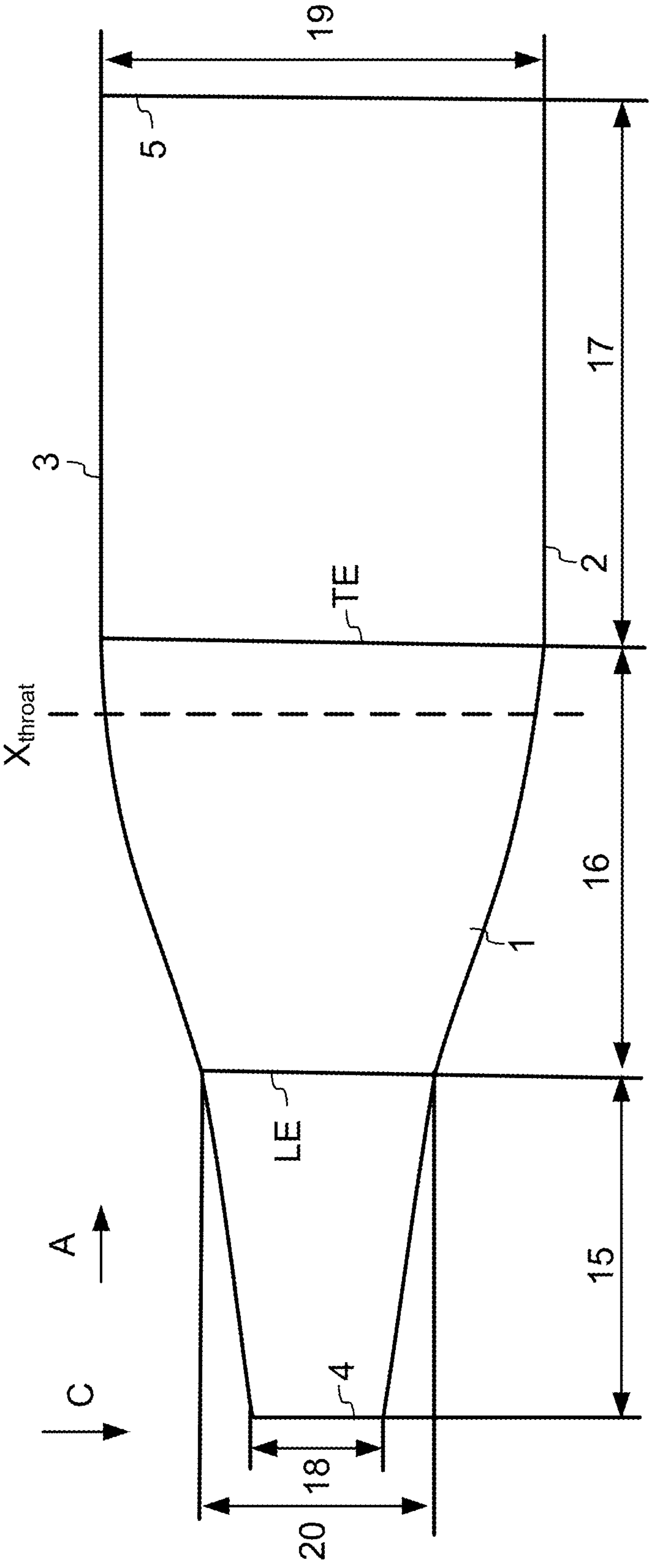
FIG. 12 illustrates an example of a turbine row in which the passage height increment is distributed unevenly between the region upstream of the airfoil leading edge and the region along the airfoil itself.

FIG. 12 illustrates an example of a turbine row in which the passage height increment (18,19) is distributed unevenly between the region upstream (15) of the airfoil leading edge (LE) and the region along the airfoil itself (16). That balance depends on many parameters, such as the value and level of fluctuations in the inlet conditions, the airfoil geometry, and other geometrical constraints, as it will be recognized by those skilled in the art. In this case, FIG. 12 shows a configuration in which the endwalls diverge very little (18,20) up to the airfoil leading edge (LE), having a sharp increase in angle and curvature along the airfoil.

Figure 13:
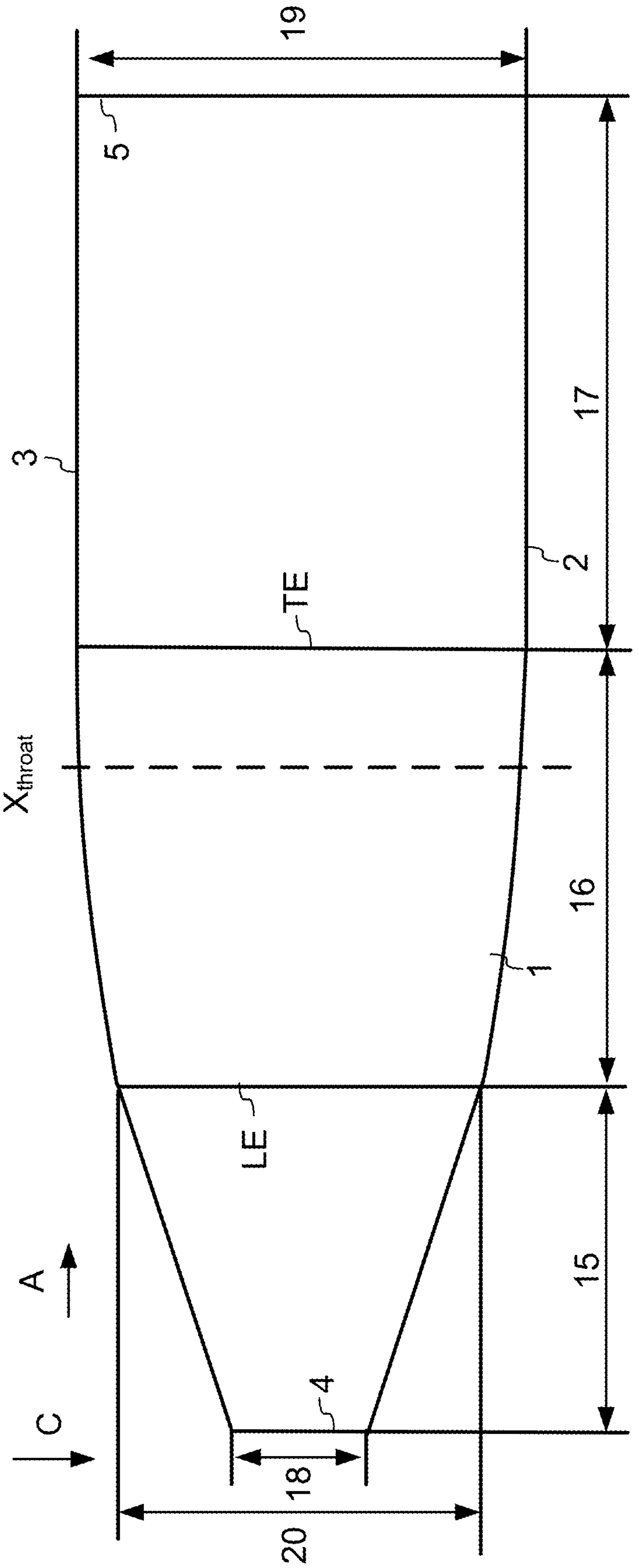
FIG. 13 illustrates a turbine row with an endwall geometry where most of the endwall contouring is done upstream of the leading edge, with the region along the airfoil having an almost constant hub and shroud radius.

Contrarily, FIG. 13 illustrates a turbine row with an endwall geometry where most of the endwall contouring (18, 20*b*) is done upstream (15) of the leading edge (LE), with the region along the airfoil (16) having an almost constant hub (2) and shroud (3) radius.

Figure 14:
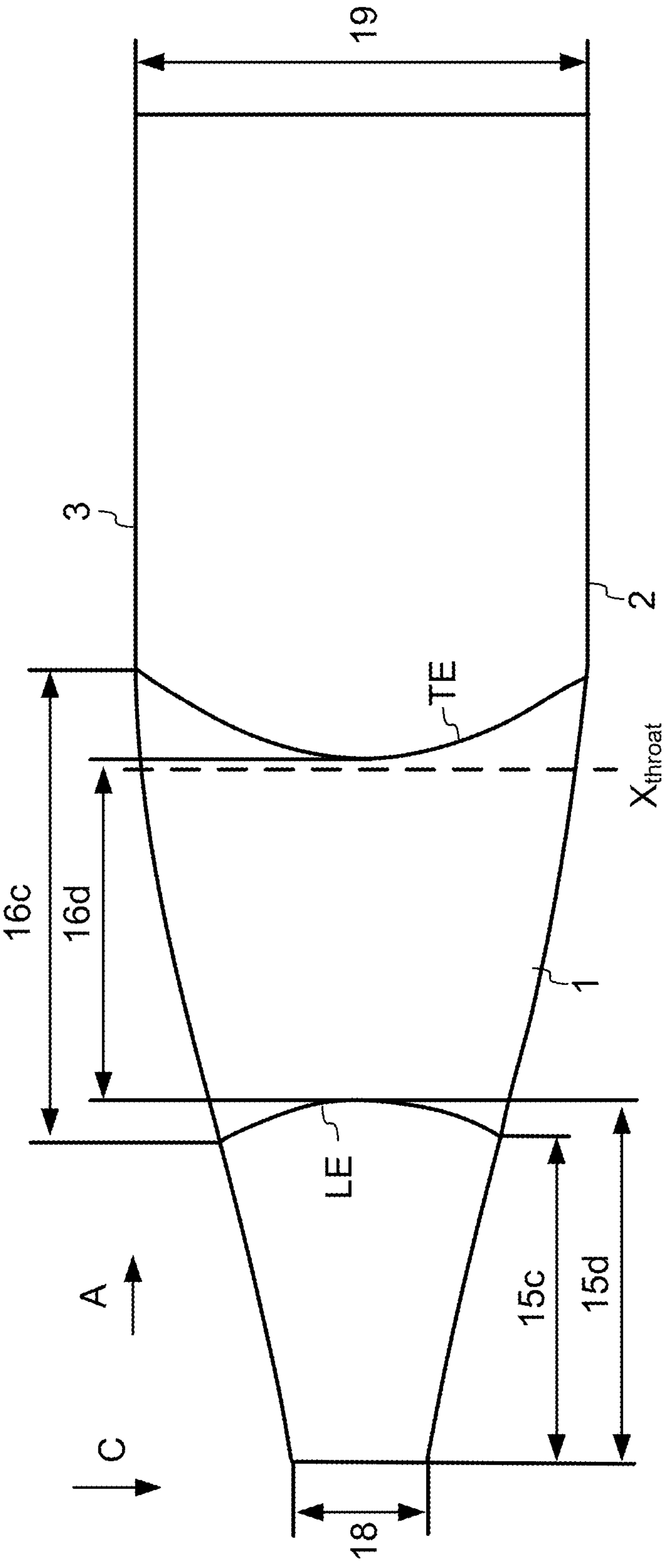
FIG. 14 depicts a unit configuration in which the airfoil axial chords vary substantially along the radial direction.

FIG. 14 depicts a unit configuration in which the airfoil axial chords vary substantially along the radial direction (C). Namely, the axial chords at the hub and shroud (16*c*) are longer than the mean radius (16*d*). This type of geometry may minimize flow separation upstream of the airfoil, which occurs near the hub (2) and shroud (3) endwalls. As can be observed, the length upstream of the leading edge (LE) near the endwalls (15*c*) is smaller than for the 50% span (15*d*). Flow separation can be minimized by only increasing the axial chord locally, maintaining the previous value at a 50% span. This configuration may increase the efficiency of the diffusion process along the channel while preserving most of the original airfoil design, providing an overall improvement.

The turbine row may be implemented in many ways. In addition, the airfoils, blades, vanes, hub, and shroud may be manufactured separately or with the turbine row. Each component may have aspects which provide the technical advancements described herein. For example, the ends of the airfoil may be contoured to match the endwall and/or shroud. Alternatively or in addition, the shroud and or endwall all may be manufactured with contouring to achieve the technical advantages described herein and then subsequently assembled.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

While various embodiments have been described, it will be apparent to those of ordinary skill in the art that many more embodiments and implementations are possible. Accordingly, the embodiments described herein are examples, not the only possible embodiments and implementations.

What is claimed is:

1. A turbine row for an axial or mixed-flow fluid machine, comprising an airfoil, having a leading edge, a trailing edge, a pressure surface and a suction surface; and two endwalls, extending from upstream of the airfoil leading edge to downstream of the airfoil trailing edge, wherein the endwalls define an inlet upstream of the leading edge of the airfoil and an outlet downstream of the airfoil, wherein the endwalls have a contoured geometry which provides an increase in channel height from the inlet to the outlet and guarantees a throat area larger than the area of the inlet.

2. The turbine row of claim 1, wherein the channel height at the throat is larger than the channel height at the inlet.

3. The turbine row of claim 1, wherein the airfoil can provide turning to the flow for any inlet Mach number, both in at subsonic and supersonic operation, without creating a normal shock upstream of the leading edge of the airfoil.

4. The turbine row of claim 1, wherein the throat to inlet area ratio is between 1 and 1.67.

5. The turbine row of claim 1, wherein the endwalls are smooth contours with an angle that varies along a flow direction.

6. The turbine row of claim 1, wherein the channel height increase is distributed along a flow direction between a region upstream of the airfoil leading edge (LE), the region along the airfoil itself and a region downstream of the airfoil trailing edge (TE).

7. The turbine row of claim 1, further including an extension to the airfoil positioned at least one of the endwalls adjacent to the airfoil.

8. The turbine row of claim 7, wherein the extension is upstream of the airfoil leading edge.

9. The turbine row of claim 7, wherein the extension is downstream of the airfoil trailing edge.

10. The turbine row of claim 1, wherein endwalls are contoured such that space between the endwalls is symmetric with respect to a passage mean radius.

11. The turbine row of claim 1, wherein endwalls are contoured such that space between the endwalls is not symmetric with respect to a passage mean radius.

12. A turbine row of claim 1, wherein a first one of the endwalls is a hub endwall and a second one of the endwalls is a shroud endwall, wherein the hub endwall does not have a change in radius, and the entire channel height variation is created by the radius increase in the shroud enwall.

13. A turbine row of claim 1, wherein a first one of the endwalls is a hub endwall and a second one of the endwalls is a shroud endwall, wherein the shroud endwall does not have any change in radius, and the entire channel height variation is created by the radius decrease in the hub endwall.

14. A turbine row of claim 1, wherein the endwalls are axisymmetric.

15. A turbine row of claim 1, wherein the endwalls are non-axisymmetric.

16. A turbine row of claim 1, wherein a chord of the airfoil has a first axial length proximate to one of the endwalls and a second axial length proximate to the mean passage radius, wherein the first axial length is greater than the second axial length.

17. A turbine row of claim 1, wherein a chord of the airfoil has a first axial length proximate to one of the endwalls and a second axial length proximate to the mean passage radius wherein the first axial length is less than the second axial length.

18. A turbine row of claim 1, wherein the airfoil of the turbine row is stationary and does not rotate about a centerline of the turbine row.

19. The turbine row of claim 1, wherein the airfoil of the turbine row rotates about a centerline of the turbine row.

20. The turbine row of claim 1, wherein the airfoil is coupled to a first one of the endwalls but not a second one of the endwalls.

21. The blade row of claim 1, wherein the airfoil is coupled to both endwalls.

* * * * *